US011656692B2

United States Patent
Munakata et al.

(10) Patent No.: US 11,656,692 B2
(45) Date of Patent: May 23, 2023

(54) INPUT DEVICE

(71) Applicant: Wacom Co., Ltd., Saitama (JP)

(72) Inventors: Hiroshi Munakata, Saitama (JP); Yuanhao Chen, Saitama (JP)

(73) Assignee: Wacom Co., Ltd., Saitama (JP)

(*) Notice: Subject to any disclaimer, the term of this patent is extended or adjusted under 35 U.S.C. 154(b) by 5 days.

(21) Appl. No.: 17/534,343

(22) Filed: Nov. 23, 2021

(65) Prior Publication Data

US 2022/0083156 A1 Mar. 17, 2022

Related U.S. Application Data

(63) Continuation of application No. 17/000,106, filed on Aug. 21, 2020, now Pat. No. 11,243,616, which is a (Continued)

(30) Foreign Application Priority Data

Mar. 5, 2018 (JP) .............................. JP2018-038512

(51) Int. Cl.
G06F 3/0346 (2013.01)
G06F 3/0354 (2013.01)

(52) U.S. Cl.
CPC ........ *G06F 3/0346* (2013.01); *G06F 3/03542* (2013.01); *G06F 3/03545* (2013.01)

(58) Field of Classification Search
CPC . G06F 3/03545; G06F 3/03542; G06F 3/0346
(Continued)

(56) References Cited

U.S. PATENT DOCUMENTS 9,329,703 B2 5/2016 Falkenburg et al.
10,922,870 B2* 2/2021 Vaganov ................. G06T 15/02
(Continued)

FOREIGN PATENT DOCUMENTS

EP 3 185 106 A1 6/2017
JP 2008-129907 A 6/2008
(Continued)

OTHER PUBLICATIONS

International Search Report, dated Mar. 12, 2019, for International Application No. PCT/JP2018/047700, 4 pages. (With English translation).
(Continued)

Primary Examiner — Calvin C Ma
(74) Attorney, Agent, or Firm — Seed IP Law Group LLP

(57) ABSTRACT

A Virtual Reality (VR) image generation system includes a sensor; a detection circuit which, in operation, detects a first indicated position indicated by an electronic pen in a first three-dimensional space in accordance with transfer of a signal between the electronic pen and the sensor; one or more processors; and one or more memory devices storing instructions that, when executed by the one or more processors, cause the one or more processors to: detect a first posture of the electronic pen in a second three-dimensional space, the first posture including at least one of a first inclination angle, a first inclination direction and a first rotation angle of the electronic pen, and generate, when the electronic pen is in the first three-dimensional space, a first VR image of drawing by the electronic pen, based on the first indicated position and the first posture.

10 Claims, 9 Drawing Sheets

Related U.S. Application Data continuation of application No. PCT/JP2018/047700, filed on Dec. 26, 2018.

(58) Field of Classification Search
USPC .................................................. 345/173, 174
See application file for complete search history.

(56) References Cited

U.S. PATENT DOCUMENTS

| | | | |
|---|---|---|---|
| 11,262,885 B1* | 3/2022 | Burckel | G06F 3/017 |
| 2006/0129933 A1 | 6/2006 | Land et al. | |
| 2016/0266682 A1 | 9/2016 | Fu et al. | |
| 2016/0306489 A1 | 10/2016 | Mizuhashi et al. | |
| 2017/0185226 A1 | 6/2017 | Matsumura et al. | |
| 2017/0242498 A1* | 8/2017 | Valentine | G06F 3/044 |
| 2019/0163320 A1 | 5/2019 | Park et al. | |
| 2020/0310561 A1* | 10/2020 | Connellan | G06F 3/03545 |

FOREIGN PATENT DOCUMENTS

| | | | |
|---|---|---|---|
| JP | 2010-205134 A | | 9/2010 |
| JP | 2016-126503 A | | 7/2016 |
| JP | 2017-117373 A | | 6/2017 |
| WO | 2015/047223 A1 | | 4/2015 |

OTHER PUBLICATIONS

Extended European Search Report, dated Nov. 10, 2021, for European Application No. 18908456.9-1216, (8 pages).

* cited by examiner

INPUT DEVICE

BACKGROUND

Technical Field

The disclosure relates to an input device suitable for use in the case where an electronic pen is used in a space.

Background Art

A drawing system that allows an animation image or the like to be created by performing a drawing by continuously indicating positions via an electronic pen for a coordinate input device called a digitizer is known.

Various methods have been proposed as methods for detecting the inclination and rotation of an electronic pen. Patent Document 1 (Japanese Patent Laid-Open No. 2016-126503) provides an electronic pen capable of detecting the inclination angle and rotation angle thereof with respect to an input surface of a sensor of a position detection device. In the case of this Patent Document 1, signals are exchanged between the electronic pen and the position detection device provided with the sensor through electromagnetic inductive coupling, capacitive coupling, or the like to enable the position detection device to detect the position indicated by the electronic pen, and in addition, the position coordinates of the position indicated by the electronic pen, and the inclination angle and rotation angle of the electronic pen.

Meanwhile, Patent Document 2 (U.S. Pat. No. 9,329,703) describes features in which a sensor capable of measuring the motion and direction of an electronic pen is contained in or attached to the electronic pen, and a detection output of the sensor is transmitted to a position detection device to enable the position detection device to detect the motion and state (e.g., inclination, rotation, etc.) of the electronic pen.

PRIOR ART DOCUMENT

Patent Documents

Patent Document 1: Japanese Patent Laid-Open No. 2016-126503
Patent Document 2: U.S. Pat. No. 9,329,703 B2

SUMMARY

Technical Problems

In the case of Patent Document 1 mentioned above, the position coordinates of the position indicated by the electronic pen and the inclination thereof are detected using a plurality of signal levels obtained from a plurality of loop coils around the position indicated by the electronic pen. However, with respect to a peripheral region of the sensor, the precision of the position coordinates of the position indicated by the electronic pen will be reduced, and a detection of the inclination of the electronic pen will be difficult, which are problems.

The problems that occur in the case of Patent Document 1 do not occur with the method of Patent Document 2. However, the method of Patent Document 2 has a problem in that a reduced response speed or a reduced precision of position coordinates may occur depending on conditions.

An object of the disclosure is to provide an input device that is able to overcome the above problems.

Technical Solution

In order to solve the above problems, an input device is provided which includes a sensor; a detection circuit which, in operation, detects a first indicated position indicated by an electronic pen in a two-dimensional space in accordance with transfer of a signal between the electronic pen and the sensor; one or more processors; and one or more memory devices storing instructions that, when executed by the one or more processors, cause the one or more processors to: detect a second indicated position indicated by the electronic pen in a three-dimensional space, and generate position information of the electronic pen based on the first indicated position and the second indicated position.

In the input device having the above-described structure, the indicated positions include not only position coordinates but also a posture (e.g., inclination, rotation, etc.). In addition, the input device having the above-described structure allows information regarding a posture included in the position indicated by the electronic pen to be outputted together with position coordinates of the first indicated position, for example.

DETAILED DESCRIPTION

Hereinafter, input devices according to embodiments of the disclosure will be described with reference to the accompanying drawings.

First Embodiment

An input device according to an embodiment described below is concerned with a spatial position indication system that includes a digitizer (pen tablet) provided with a sensor that performs at least one of transmission and reception of a signal (hereinafter referred to as "transfer of a signal") in relation to an electronic pen, and a spatial position detector that detects information regarding a position indicated by the electronic pen in a space. Notice that the position includes not only position coordinates but also a posture (e.g., an inclination, a rotation, etc.) and so on, but in the following description, information regarding the position coordinates and information regarding the posture will be described as separate pieces of information to distinguish both.

Figure 1:
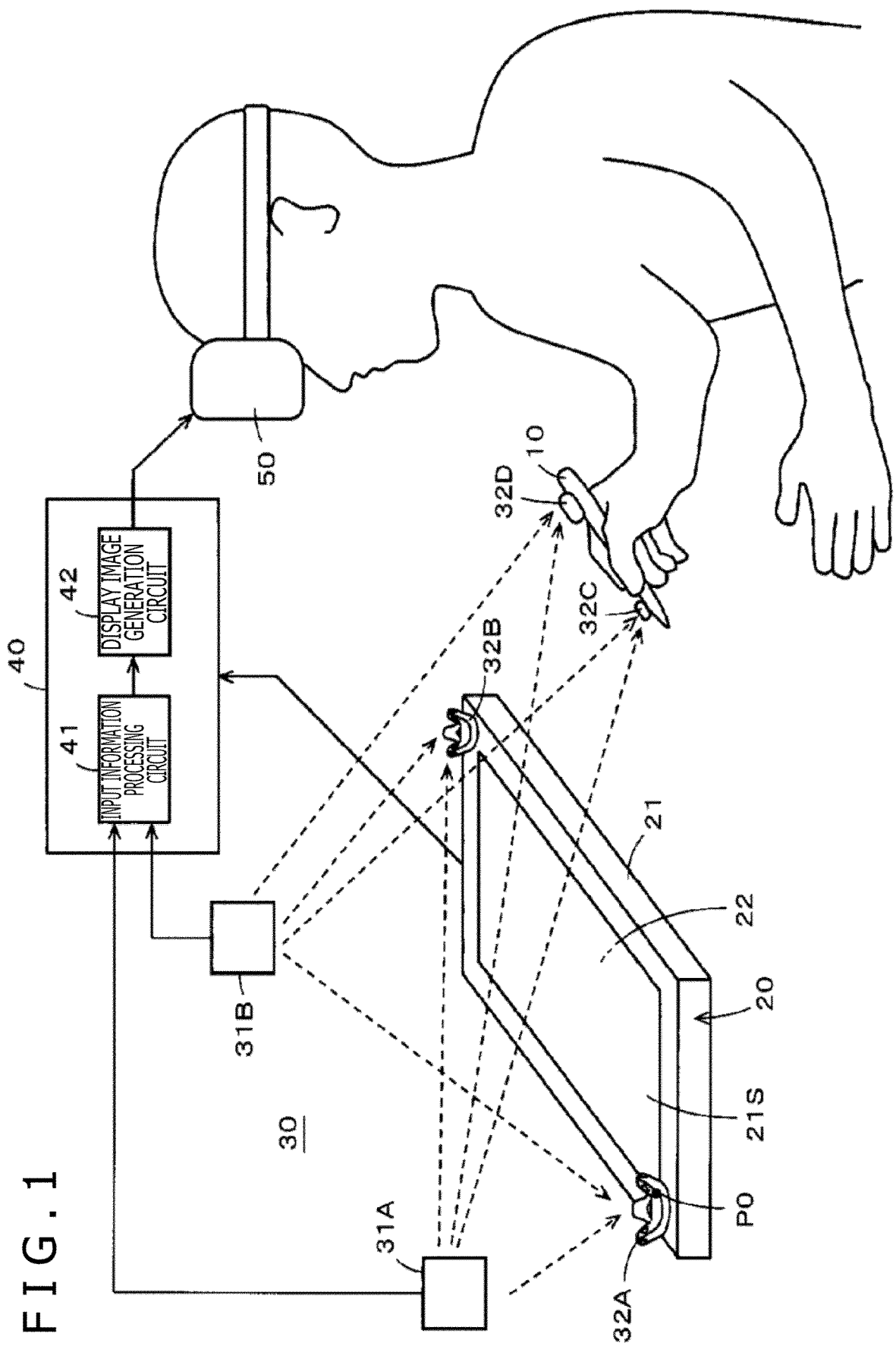
FIG. 1 is a diagram for explaining an example configuration of a spatial position indication system including an input device according to a first embodiment of the disclosure.
Figure 2:
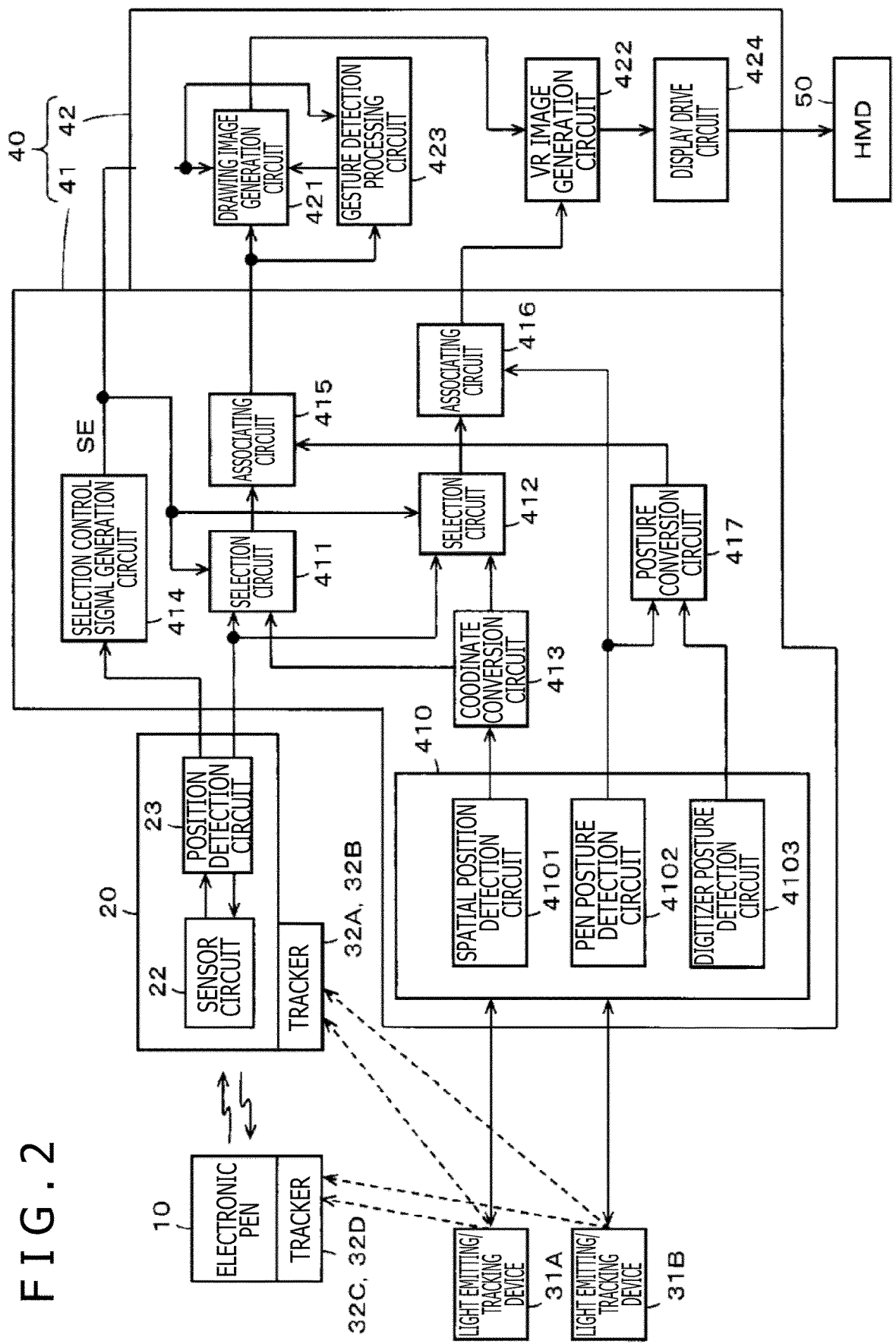
FIG. 2 is a block diagram for explaining an example configuration of various circuits of the spatial position indication system in the example of FIG. 1.

In the spatial position indication system according to this embodiment, a display circuit is formed by a head-mounted display, a smart glass, or the like, and a 3D (Three-Dimensional) drawing space is used as a space of a virtual reality (which may be VR (Virtual Reality), MR (Mixed Reality), AR (Augmented Reality), or the like, hereinafter referred to simply as VR). FIG. 1 is a diagram illustrating an outline of the overall configuration of a spatial position indication system including an input device according to a first embodiment, in which a space of a VR is a 3D drawing space. FIG. 2 is a block diagram illustrating an example of the detailed configuration of functions of various circuits of the spatial position indication system including the input device according to the first embodiment.

Specifically, as illustrated in FIG. 1, the spatial position indication system according to this example embodiment includes an electronic pen 10, a digitizer 20, a spatial position detector 30, a spatial drawing information generation device 40, and a head-mounted display (hereinafter referred to as an HMD) 50. As illustrated in FIG. 2, in this example, the spatial drawing information generation device 40 has functions of an input information processing circuit 41 and a display image generation circuit 42, and is formed by, for example, a computer.

The input device according to this first embodiment includes a first detection circuit that detects a position indicated by the electronic pen 10 in accordance with transfer of a signal between the electronic pen 10 and the first detection circuit, a second detection circuit that detects a position indicated by the electronic pen 10 in a three-dimensional space in which the electronic pen 10 exists, and a control circuit that generates position information of the electronic pen 10 on the basis of these indicated positions. In this first embodiment, the first detection circuit is formed by the digitizer 20, the second detection circuit is formed by the spatial position detector 30 and a spatial information processing circuit 410 of the input processing circuit 41, and the control circuit is formed by the input information processing circuit.

An electronic pen that employs an electromagnetic induction method is used as an example of the electronic pen 10 in this first embodiment, but it is to be understood that the electronic pen 10 may employ a capacitive coupling method or the like instead of the electromagnetic induction method. The digitizer 20 includes a slim housing 21 in the shape of a rectangular parallelepiped, and a front surface thereof is an input surface 21S for a position indication by the electronic pen 10. In addition, the digitizer 20 includes a sensor 22 and a position detection circuit 23 (see FIG. 2).

Although not illustrated in the figures, the sensor 22 includes a plurality of loop coils arranged in a horizontal direction (i.e., an X-axis direction) of the housing of the digitizer 20 and in a vertical direction (i.e., a Y-axis direction) of the housing. In this example, the digitizer 20 is configured to employ the electromagnetic induction method in accordance with the electronic pen 10, but may alternatively employ a method other than the electromagnetic induction method.

Although not illustrated in the figures, the electronic pen 10 includes, at a pen point, a resonant circuit (not illustrated) made up of a coil and a capacitor, and transfer of signals is performed between the electronic pen 10 and the sensor 22 of the digitizer 20 through electromagnetic inductive coupling between the loop coils of the sensor 22 of the digitizer 20 and the resonant circuit of the electronic pen 10.

The position detection circuit 23 of the digitizer 20 supplies signals to the electronic pen 10 through the loop coils of the sensor 22, and receives signals fed back from the electronic pen 10 through the loop coils, and, on the basis of the signals received, detects a position indicated by the electronic pen 10 in a detection region of the sensor 22. Notice that, in this embodiment, the digitizer 20 is configured to detect a position indicated by the pen point of the electronic pen 10 as the position indicated by the electronic pen 10.

In the digitizer 20 in this example, the plurality of loop coils of the sensor 22 are arranged to cover substantially the entire area of the input surface 21S.

In addition, in this embodiment, a position detection region, in which the position indicated by the electronic pen 10 can be detected by the digitizer 20, includes not only a planer region when the pen point of the electronic pen 10 is in contact with the input surface 21S of the digitizer 20, but also a spatial region (i.e., a hover region for the electronic pen 10 in a hovering state) in which the position indicated by the electronic pen 10 can be detected through transfer of signals through electromagnetic coupling when the pen point of the electronic pen 10 is not in contact with the input surface 21S of the digitizer 20 and is spaced apart from the input surface 21S in a direction (i.e., a Z-axis direction perpendicular to both the X-axis direction and the Y-axis direction) perpendicular to the input surface 21S.

In this example, the spatial position detector 30 is configured to set a three-dimensional spatial region in which the digitizer 20 exists, and to be capable of, in the three-dimensional spatial region, detecting the position indicated by the pen point of the electronic pen 10 and the posture (referred to as a pen posture) of the electronic pen 10, such as the inclination angle and the rotation angle of the electronic pen 10, and also detecting the position of the digitizer 20 and the inclination angle and inclination direction thereof with respect to a horizontal plane.

The spatial position detector 30 is configured to include two light emitting/tracking devices 31A and 31B, and a plurality of optical position notification circuits (hereinafter referred to as trackers) 32A, 32B, 32C, and 32D. In this embodiment, as described below, on the HMD 50, a 3D drawing image drawn in a spatial motion detection region MD including a position detection region DT of the digitizer 20 is displayed as a virtual display image, and a virtual display image of the electronic pen 10 is displayed.

The two light emitting/tracking devices 31A and 31B have the same configuration, and each include a laser beam emitting circuit that emits infrared laser beams, searching means that searches the spatial motion detection region MD with the emitted infrared laser beams, and optical position detection means that detects a light emission of a light emitting circuit of each of the trackers 32A, 32B, 32C, and 32D in response to receiving the infrared laser beam.

In this embodiment, objects (i.e., objects to be searched for in a spatial search region of the spatial position detector 30) onto which the trackers 32A, 32B, 32C, and 32D are attached are the electronic pen 10 and the digitizer 20 as mentioned above. Specifically, in this example, the tracker 32A and the tracker 32B are attached onto a top left corner and a bottom right corner, respectively, of the slim housing of the digitizer 20 in the shape of a rectangular parallelepiped, to enable notification of the position of the digitizer 20 and the inclination angle and inclination direction thereof with respect to the horizontal plane. In addition, the tracker 32C is attached onto the electronic pen 10 on a pen-point side thereof, and the tracker 32D is attached onto the electronic pen 10 on a rear-end side thereof opposite to the pen-point side in a direction of an axis-center of a housing of the electronic pen 10, to enable notification of the position of the electronic pen 10 and the pen posture (e.g., the inclination angle and the rotation angle).

Each of the light emitting/tracking devices 31A and 31B controls the laser beam emitting circuit via the searching means, and performs a search by emitting the infrared laser beams so as to search and scan the spatial motion detection region MD to detect tracker positions. Each of the trackers 32A, 32B, 32C, and 32D performs monitoring for a reception of the infrared laser beam with a sensor, and, when a reception of the infrared laser beam is detected by the sensor, lights up the light emitting circuit, formed by an LED (Light Emitting Diode).

The light emitting/tracking devices 31A and 31B detect the positions of the objects onto which the trackers 32A, 32B, 32C, and 32D are attached in the spatial motion detection region MD, by detecting the light emission of the light emitting circuits of the trackers 32A, 32B, 32C, and 32D. Each of the light emitting/tracking devices 31A and 31B is configured to be capable of, when a light emission of the light emitting circuit of each of the trackers 32A, 32B, 32C, and 32D has been detected, detecting a time that has elapsed from an emission time of the emitted infrared laser beam at the time of the detection as well. In this case, each of the trackers 32A, 32B, 32C, and 32D performs a different light emission in accordance with its own identification information.

Each of the two light emitting/tracking devices 31A and 31B is connected to the spatial drawing information generation device 40 in a wired or wireless manner, and provides, to the spatial drawing information generation device 40, information regarding the spatial position of each of the trackers 32A, 32B, 32C, and 32D detected in the spatial motion detection region MD.

The information regarding the spatial position of each of the trackers 32A, 32B, 32C, and 32D in the spatial motion detection region MD detected by the two light emitting/tracking devices 31A and 31B is, in this example, supplied to the spatial information processing circuit 410 of the input information processing circuit 41 of the spatial drawing information generation device 40 as illustrated in FIG. 2.

In this example, the spatial information processing circuit 410 includes a spatial position detection circuit 4101, a pen posture detection circuit 4102, and a digitizer posture detection circuit 4103. The spatial position detection circuit 4101 detects the position of the digitizer 20 in the spatial motion detection region MD from the trackers 32A and 32B, and also detects the position indicated by the electronic pen 10 as the position of the pen point of the electronic pen 10, and the position of a rear end of the electronic pen 10, from the trackers 32C and 32D. In this example, the pen posture detection circuit 4102 detects the pen posture, including the inclination angle and the rotation angle of the electronic pen 10, from the trackers 32C and 32D. In addition, the digitizer posture detection circuit 4103 detects the position indicated by the electronic pen 10 as the position of the point.

In addition, in this embodiment, the input information processing circuit 41 generates information to be supplied to the display image generation circuit 42 from the information regarding the position indicated by the electronic pen 10 in the position detection region DT, which has been detected by the digitizer 20, and the information regarding the position (i.e., the indicated position and the position of the rear end) of the electronic pen 10 in the spatial motion detection region MD, pen posture information, and digitizer posture information, which have been detected by the spatial information processing circuit 410 of the input information processing circuit 41. Then, the input information processing circuit 41 supplies the generated information to the display image generation circuit 42.

In addition, as illustrated in FIG. 2, in this embodiment, the display image generation circuit 42 of the spatial drawing information generation device 40 includes a drawing image generation circuit 421 for generating a 3D drawing image, and a VR image generation circuit 422 for generating VR images to be displayed on the HMD 50.

The drawing image generation circuit 421 generates a 3D drawing image on the basis of a position indication by the electronic pen 10, and also performs a process of, for example, transforming, rotating, or moving a 3D drawing image on the basis of a gesture made by an operator of the electronic pen 10. In addition, in this embodiment, the drawing image generation circuit 421 causes the pen posture, including the inclination angle, inclination direction, and rotation angle of the electronic pen 10 with respect to the input surface 21S of the digitizer 20, as well to be reflected in the generation of the 3D drawing image. For example, in the case where transfer of signals between the electronic pen 10 and the digitizer 20 is performed, the inclination angle and inclination direction of the electronic pen 10 with respect to the input surface 21S of the digitizer 20 are used. Hereinafter, a process related to the 3D drawing image will be referred to as a 3D drawing-related process.

In this embodiment, the pen posture, including the inclination angle, inclination direction, and rotation angle of the electronic pen 10, can be detected through the spatial position detector 30 using the trackers 32C and 32D attached onto the electronic pen 10. Thus, in this embodiment, the input information processing circuit 41 is configured to supply, to the display image generation circuit 42, information regarding the pen posture of the electronic pen 10 detected by the spatial position detector 30 as information to be used in the 3D drawing-related process.

Specifically, as described below, the input information processing circuit 41 is configured to supply, to the display image generation circuit 42, the information (i.e., information regarding the position of the pen point) about the position indication by the electronic pen 10, and the information regarding the pen posture of the electronic pen 10, to cause information regarding the pen posture, such as the inclination, rotation of the electronic pen 10 at the time of a drawing input based on the position indication by the electronic pen 10 to be reflected in the 3D drawing image.

In addition, as illustrated in FIG. 2, the display image generation circuit 42 includes a gesture detection processing circuit 423 for detecting a gesture performed by the operator of the electronic pen 10. In addition, in this embodiment, the input information processing circuit 41 is configured to supply, to the gesture detection processing circuit 423, the information regarding the pen posture, and position information (corresponding to the information regarding the indicated position) of the pen point of the electronic pen 10 detected in the spatial position detector 30.

As described above, in this embodiment, not only the information regarding the position indicated by the electronic pen 10 detected in the digitizer 20, but also the information regarding the position (i.e., the position of the pen point) indicated by the electronic pen 10 and the information regarding the pen posture detected in the spatial position detector 30, are used as the information to be used in the 3D drawing-related process.

The VR image generation circuit 422 of the display image generation circuit 42 generates the VR images to be displayed on the HMD 50. In this embodiment, examples of the VR images include a VR image of the electronic pen 10 and a VR image of the 3D drawing image generated by the drawing image generation circuit 421, and the VR image of the 3D drawing image generated by the drawing image generation circuit 421 and the VR image of the electronic pen 10 are displayed in a 3D fashion on the HMD 50. Note that the VR image generation circuit 422 may be configured to generate a VR image of the digitizer 20 as well. Hereinafter, a process related to the generation of a VR image in the VR image generation circuit 422 will be referred to as a VR image-related process.

In this embodiment, information for generating the VR image of the electronic pen 10 is supplied from the input information processing circuit 41 to the VR image generation circuit 422, and information of the generated 3D drawing image is supplied from the drawing image generation circuit 421 to the VR image generation circuit 422. Then, VR image information generated in the VR image generation circuit 422 is supplied to the HMD 50 through a display drive circuit 424, and is displayed on a display screen, which is, for example, formed by an LCD (Liquid Crystal Display), of the HMD 50.

In this case, when the electronic pen 10 exists in the position detection region DT, the information regarding the position indicated by the electronic pen from the digitizer 20, which is capable of detecting the position (i.e., the position of the pen point) of the electronic pen 10 with higher precision than the spatial position detector 30, and the information regarding the pen posture, such as the inclination, rotation detected using the spatial position detector 30 are supplied from the input information processing circuit 41 to the VR image generation circuit 422 of the display image generation circuit 42.

Meanwhile, when the electronic pen 10 exists in the spatial motion detection region MD, the digitizer 20 is not able to detect the position indicated by the electronic pen 10, and accordingly, the information regarding the pen posture and the information regarding the position indicated by the electronic pen detected using the spatial position detector 30 are supplied from the input information processing circuit 41 to the VR image generation circuit 422 of the display image generation circuit 42.

As described above, in this embodiment, not only the information regarding the pen posture and the information regarding the position (i.e., the position of the pen point) indicated by the electronic pen 10 detected by the spatial position detector 30, but also the information regarding the position indicated by the electronic pen 10 detected by the digitizer 20, are used as information to be used in the VR image-related process.

The input information processing circuit 41 generates the information to be used in the drawing-related process as described above and the information to be used in the VR image-related process from the information from the digitizer 20 and the information from the spatial position detector 30, and supplies the generated information to the display image generation circuit 42, and in addition, generates a switching control signal SE for selection control depending on whether the electronic pen 10 exists in the position detection region DT or in the spatial motion detection region MD.

As described above, in this embodiment, a complementary use of information regarding a spatial coordinate system of the position detection region DT of the digitizer 20 and information regarding a spatial coordinate system of the spatial motion detection region MD of the spatial position detector 30 is possible in each of the 3D drawing-related process and the VR image-related process. In this case, each of the two spatial coordinate systems may be independently set, but in this embodiment, the information regarding one of the two spatial coordinate systems is converted to information regarding the other spatial coordinate system to enable the information to be dealt with as information in a common coordinate space. In this embodiment, the information regarding the spatial coordinate system of the spatial motion detection region MD of the spatial position detector 30 is converted to information regarding the spatial coordinate system of the position detection region DT of the digitizer 20.

In the spatial position indication system according to this embodiment, the information regarding the pen posture of the electronic pen 10 detected in the spatial motion detection region MD of the spatial position detector 30 can be used in both the 3D drawing-related process and the VR image-related process.

In this case, in the VR image-related process, the information regarding the pen posture of the electronic pen 10 is reflected in the posture of the VR image of the electronic pen 10. This information regarding the pen posture of the electronic pen 10 includes information regarding the inclination angle of the electronic pen 10, and in the 3D drawing-related process, this inclination angle of the electronic pen 10 is an inclination angle relative to the input surface of the sensor 22 of the digitizer 20. Meanwhile, the information regarding the pen posture of the electronic pen 10 detected in the spatial motion detection region MD of the spatial position detector 30 represents an inclination angle in the spatial motion detection region MD of the spatial position detector 30 with respect to the direction of gravity of the earth or a horizontal plane, for example.

If the digitizer 20 can be set such that a direction perpendicular to the input surface 21S of the sensor 22 thereof precisely coincides with the Z-axis direction of the spatial motion detection region MD of the spatial position detector 30, the inclination angle of the electronic pen 10 detected in the space of the spatial motion detection region MD of the spatial position detector 30 will coincide with the inclination angle relative to the input surface of the sensor 22 of the digitizer 20. In actuality, however, the digitizer 20 is sometimes set at an angle with respect to the spatial motion detection region MD of the spatial position detector 30.

Accordingly, in this embodiment, the absolute inclination angle of the electronic pen 10 detected in the space of the spatial motion detection region MD of the spatial position detector 30 is converted to the inclination angle relative to the input surface of the sensor 22 of the digitizer 20 as described below.

Figure 3:
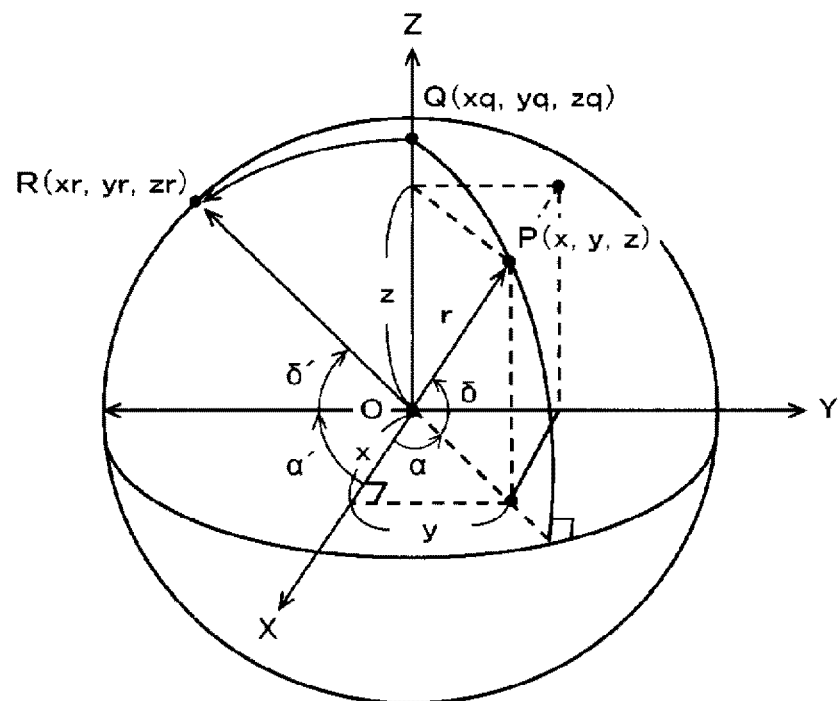
FIG. 3 is a diagram for explaining an input device according to an embodiment of the disclosure.

FIG. 3 is a diagram used for explaining a process of converting the inclination angle. FIG. 3 illustrates a spherical coordinate system with the pen point of the electronic pen 10 at a point O in the center of a sphere. An X-Y plane (i.e., a plane including the X-axis direction and the Y-axis direction perpendicular to each other) in FIG. 3 corresponds to a horizontal plane in the spatial region of the spatial motion detection region MD of the spatial position detector 30.

In FIG. 3, a point representing the position of an edge of a rear end portion of the housing of the electronic pen 10, which is on the opposite side with respect to the pen point in the direction of the axis-center, is expressed by spherical coordinates. In this case, the radius r of the sphere corresponds to the length of the housing of the electronic pen 10 in the direction of the axis-center thereof. The inclination angle and the inclination direction of the electronic pen 10 in the space of the spatial motion detection region MD when the edge of the rear end portion in the direction of the axis-center of the housing of the electronic pen 10 is at a point P in the spherical coordinate system of FIG. 3 can be detected as δ and α, respectively, by using the spatial position detector 30. In addition, in the example of FIG. 3, the inclination angle and the inclination direction of the housing of the digitizer 20 in the space of the spatial motion detection region MD can be detected as 67' and α', respectively, by using the spatial position detector 30.

Then, as illustrated in FIG. 3, assuming that the position of the rear-end edge of the electronic pen 10 in a state in which the direction of the axis-center of the housing of the electronic pen 10 coincides with a vertical direction in the space of the spatial motion detection region MD is at a point Q, the position of the rear-end edge of the electronic pen 10 when the direction of the axis-center of the housing of the electronic pen 10 coincides with the direction perpendicular to the input surface 21S of the sensor 22 of the digitizer 20 is at a point R.

Accordingly, if an angle formed between a spatial vector OR from the point O to the point R and a spatial vector OP from the point O to the point P is obtained, use of this angle makes it possible to convert the inclination angle and the inclination direction of the electronic pen 10 detected using the spatial position detector 30 to the inclination angle and the inclination direction of the electronic pen 10 relative to the input surface 21S of the sensor 22 of the digitizer 20.

Note that, with the reverse of the above-described conversion, the inclination angle and the inclination direction of the electronic pen 10 relative to the input surface 21S of the sensor 22 of the digitizer 20 can be converted to the inclination angle and the inclination direction of the electronic pen 10 detected using the spatial position detector 30.

Next, an example configuration of the input information processing circuit 41 of FIG. 2, which is configured to implement the above-described features, will be described below. That is, the position detection circuit 23 of the digitizer 20 supplies a detection output of the position indicated by the electronic pen 10 to a selection circuit 411 as one input signal therefor, and supplies the detection output to a selection circuit 412 as one input signal therefor. Notice that this information supplied from the position detection circuit 23 to each of the selection circuits 411 and 412 includes, in addition to the detection output of the position indicated by the electronic pen 10, information regarding a pen pressure applied to the electronic pen 10.

Meanwhile, the spatial position detection circuit 4101 of the spatial information processing circuit 410 supplies a detection output of the spatial position (i.e., the position indicated by the electronic pen) of the pen point of the electronic pen 10 to a coordinate conversion circuit 413. This coordinate conversion circuit 413 converts the information regarding the spatial coordinate system of the spatial motion detection region MD of the spatial position detector 30 to information regarding the spatial coordinate system of the position detection region DT of the digitizer 20. Then, the coordinate conversion circuit 413 supplies the converted coordinate output to each of the selection circuits 411 and 412 as another input signal therefor.

In addition, in this embodiment, the position detection circuit 23 of the digitizer 20 supplies, to a selection control signal generation circuit 414, information regarding the signal level of a reception signal from the electronic pen 10. The selection control signal generation circuit 414 detects a distance by which the pen point of the electronic pen 10 is spaced from the input surface 21S of the digitizer 20 from the signal level of the reception signal from the electronic pen 10, and generates a selection control signal SE on the basis of the detected distance from the input surface 21S.

In this case, the selection control signal SE is a signal for controlling the detection output of the position from the position detection circuit 23 of the digitizer 20 to be selected when the distance by which the pen point of the electronic pen 10 is spaced from the input surface 21S of the digitizer 20 is equal to or smaller than a maximum height Lz in the Z-axis direction that allows the digitizer 20 to detect the hovering state of the electronic pen, and controlling the detection output from the spatial position detection circuit 4101 to be selected when the aforementioned distance is greater than the aforementioned maximum height Lz.

The selection circuit 411 selectively supplies one of the inputs to an associating circuit 415 for the 3D drawing-related process in accordance with the selection control signal SE. Meanwhile, the selection circuit 412 selectively supplies one of the inputs to an associating circuit 416 for the VR image-related process in accordance with the selection control signal SE.

Although, in the example of FIG. 2, the two selection circuits 411 and 412 are provided for the 3D drawing-related process and the VR image-related process, respectively, to clearly distinguish between the two processes, only one common selection circuit would suffice in reality, and an output from this common selection circuit may be supplied to each of the associating circuits 415 and 416.

The information regarding the pen posture detected by the pen posture detection circuit 4102 of the spatial information processing circuit 410 with use of the spatial position detector 30 is, as it is, supplied to the associating circuit 416 for the VR image-related process.

The associating circuit 416 for the VR image-related process associates the information regarding the position indicated by the electronic pen 10 from the selection circuit 412 with the information regarding the pen posture from the pen posture detection circuit 4102 of the spatial information processing circuit 410 to form a pair, and supplies the pair to the VR image generation circuit 422 of the display image generation circuit 42. In this case, the associating in the associating circuit 416 means associating, with the position indicated by the electronic pen 10 outputted from the selection circuit 412, the information regarding the pen posture detected at the position indicated by the electronic pen 10 to form a pair.

In the case where the information regarding the position indicated by the electronic pen 10 and the information regarding the pen posture associated with each other in the associating circuit 416 are both information from the spatial information processing circuit 410, the associating can be accomplished in the associating circuit 416 by simply pairing pieces of information of the same timing with output timing of these pieces of information being adjusted in the spatial information processing circuit 410.

In contrast, in the case where the information regarding the position indicated by the electronic pen 10 subjected to the associating in the associating circuit 416 is information from the digitizer 20, the information regarding the position indicated by the electronic pen 10 and the information regarding the pen posture are associated with each other in the associating circuit 416 with a lag (i.e., a processing delay) in output timing between the detection results of the digitizer 20 and the spatial position detector 30 taken into account.

The VR image generation circuit 422 of the display image generation circuit 42 generates the VR image of the electronic pen 10 using the information regarding the position indicated by the electronic pen 10 and the information regarding the pen posture from the associating circuit 416. In this case, the VR image of the electronic pen 10 is generated to be displayed at a position based on the information regarding the position indicated by the electronic pen 10.

In this case, while the information regarding the position indicated by the electronic pen 10 from the selection circuit 412 is selectively chosen in accordance with the selection control signal SE, the information regarding the indicated position from the spatial position detection circuit 4101 is subjected to coordinate conversion in the coordinate conversion circuit 413 so that the digitizer 20 and the spatial position detector 30 share a common coordinate space, and therefore, a switching at the selection circuit 412 would not cause a faulty display, such as, for example, a jumping movement of the position at which the VR image of the electronic pen 10 is displayed.

The information regarding the pen posture from the pen posture detection circuit 4102 of the spatial information processing circuit 410 is also supplied to the associating circuit 415 for the 3D drawing-related process through a posture conversion circuit 417. The information regarding the pen posture from the pen posture detection circuit 4102 and the information regarding the posture of the digitizer 20 detected in the digitizer posture detection circuit 4103 are supplied to the posture conversion circuit 417, and in the posture conversion circuit 417, a process of converting the pen posture of the electronic pen 10 in the spatial coordinate system detected in the spatial position detector 30 to a pen posture relative to the input surface 21S of the sensor 22 of the digitizer 20 as described above with reference to FIG. 3 is performed.

The associating circuit 415 for the 3D drawing-related process associates the information regarding the position indicated by the electronic pen 10, which has been supplied from the selection circuit 411, and the information regarding the pen posture detected in the pen posture detection circuit 4102 converted to information regarding the pen posture relative to the input surface 21S of the digitizer 20, which has been supplied from the posture conversion circuit 417, with each other to form a pair, and supplies the pair to each of the drawing image generation circuit 421 and the gesture detection processing circuit 423 of the display image generation circuit 42. In this case, as is similarly the case with the associating circuit 416, the associating in the associating circuit 415 means associating, with the position indicated by the electronic pen 10 outputted from the selection circuit 412, the information regarding the pen posture detected at the position indicated by the electronic pen 10 to form a pair.

The drawing image generation circuit 421 has a pen drawing function of drawing a precise line or the like on the basis of the detection output of the position indicated by the electronic pen 10 from the digitizer 20 and the information regarding the pen posture detected in the spatial position detector 30 in this embodiment, and a gesture processing function of performing a drawing process based on a motion (gesture) detected in the gesture detection processing circuit 423 on the basis of the pen posture and the spatial position of the electronic pen 10 detected by the spatial position detector 30.

In addition, the selection control signal SE is supplied from the selection control signal generation circuit 414 to each of the drawing image generation circuit 421 and the gesture detection processing circuit 423, and the gesture detection processing circuit 423 is controlled to operate when the position indicated by the electronic pen 10 lies outside of the spatial region of the position detection region DT of the digitizer 20, while the drawing image generation circuit 421 is selectively controlled to perform the pen drawing function when the position indicated by the electronic pen 10 lies within the spatial region of the position detection region DT of the digitizer 20, and perform a gesture process when the position indicated by the electronic pen 10 lies outside of the spatial region of the position detection region DT of the digitizer 20.

In this case, in this embodiment, the coordinate conversion is performed using the coordinate conversion circuit 413 so that the digitizer 20 and the spatial position detector 30 share a common coordinate space, and therefore, a switching in the position indicated by the electronic pen 10 at the selection circuit 411 would not cause a jumping displacement of the position indicated by the electronic pen 10. Moreover, even the pen posture detected by the spatial position detector 30 is appropriately reflected in the 3D drawing image because the pen posture is converted to the pen posture relative to the input surface 21S of the digitizer 20.

As described above, 3D drawing image information generated in the drawing image generation circuit 421 is supplied to the VR image generation circuit 422 to form a VR image, and the VR image is supplied to the HMD 50 through the display drive circuit 424 to be displayed. In this case, in this embodiment, the spatial coordinate system of the 3D drawing image and the spatial coordinate system of the VR image, such as of the electronic pen 10, are identical because the positions indicated by the electronic pen 10 are expressed by spatial coordinates common to the digitizer 20 and the spatial position detector 30 through use of the coordinate conversion circuit 413. Accordingly, the positions indicated by the electronic pen 10 for the 3D drawing image are not different between the 3D drawing-related process and the VR image-related process, eliminating the need for the VR image generation circuit 422 to correct spatial coordinates for the two.

As will be understood from the foregoing description, this first embodiment produces a beneficial effect of being able to use the pen posture of the electronic pen 10 detected in the spatial position detector 30 in the generation of the 3D drawing image in the 3D drawing-related process, without the need for the electronic pen 10 and the digitizer 20 to have a function of detecting the pen posture, such as the inclination angle, rotation angle of the electronic pen 10. In addition, this first embodiment also produces a beneficial effect of being able to use the information regarding the pen posture of the electronic pen 10 detected by the spatial position detector 30 in the spatial region outside of the position detection region DT of the digitizer 20 for a gesture detection to generate the 3D drawing image. Further, this first embodiment is characterized in that a switching between the output from the digitizer 20 and the output from the spatial position detector 30 in the 3D drawing-related process would not cause a coordinate displacement, since spatial coordinates in the detection region of the digitizer 20 and spatial coordinates in the detection region of the spatial position detector 30 can be handled as common coordinates.

Accordingly, the operator is able to seamlessly shift from detailed drawing to an operation by a gesture by simply moving the electronic pen 10 in a space over the digitizer 20 without being conscious of a switching between the digitizer 20 and the spatial position detector 30.

In addition, in the above-described first embodiment, as the position information (i.e., the position information of the pen point) of the electronic pen 10 used to generate the VR image of the electronic pen 10 in the VR image-related process, the position detection output of the digitizer 20, which provides a higher precision and a higher response speed than the detection output of the spatial position detector 30, can be used in the spatial region of the position detection region DT of the digitizer 20, and accordingly, a VR image that is properly responsive to an actual operation of the electronic pen by the user can be obtained.

It is needless to say that, since the above-described spatial drawing information generation device 40 is formed by a computer, the various circuits of the input information processing circuit 41 and the display image generation circuit 42 can be formed as functional software circuits implemented by a software program. For example, the various circuits described herein are implemented by one or more processors and one or more memory devices storing instructions that, when executed by the one or more processors, cause the circuits to perform the acts described herein.

Second Embodiment

In the above-described first embodiment, each of the electronic pen 10 and the digitizer 20 does not have the function of detecting the pen posture, such as the inclination angle, rotation angle of the electronic pen, but each of the electronic pen 10 and the digitizer 20 may alternatively be configured to have the function of detecting the pen posture, such as the inclination angle, rotation angle of the electronic pen.

An input device according to a second embodiment, which will be described below, is used in a system similar to the spatial position indication system described above with respect to the first embodiment, and includes an electronic pen and a digitizer having the function of detecting the pen posture, such as the inclination angle, rotation angle of the electronic pen.

Figure 4:
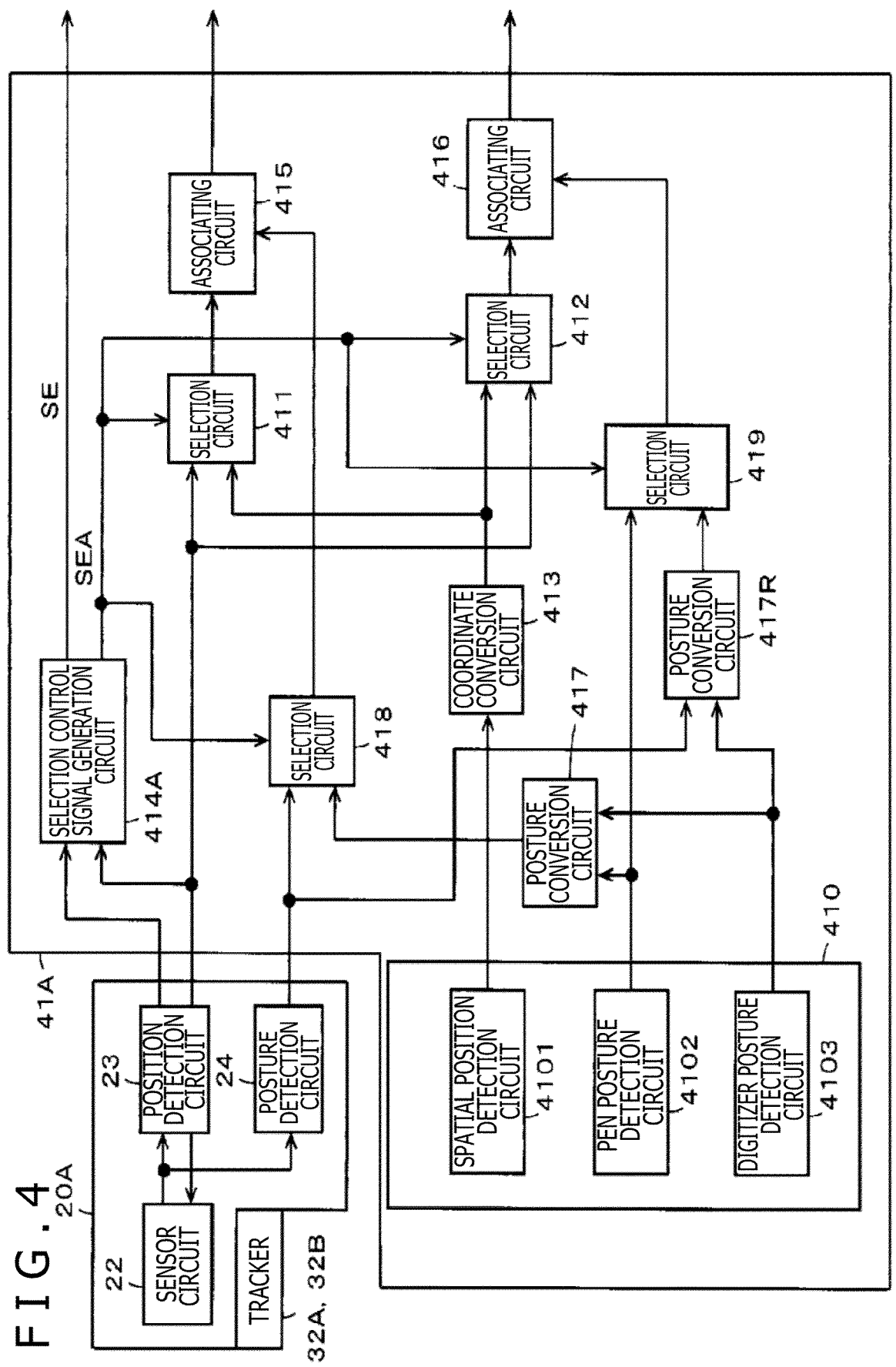
FIG. 4 is a block diagram for explaining an example configuration of various circuits of an input device according to a second embodiment of the disclosure.

FIG. 4 illustrates an example configuration of important circuits of a spatial position indication system according to this second embodiment. The spatial position indication system according to this second embodiment has a configuration similar to that of the spatial position indication system according to the first embodiment, but is provided with an electronic pen 10A (not illustrated in FIG. 4) and a digitizer 20A having a configuration for detecting the pen posture in place of the electronic pen 10 and the digitizer 20. In addition, in place of the input information processing circuit 41 of the spatial drawing information generation device 40 in the first embodiment, an input information processing circuit 41A having a configuration illustrated in FIG. 4 is provided.

The spatial position indication system according to this second embodiment is also provided with the spatial position detector 30, the display image generation circuit 42, and the HMD 50, which have been described in connection with the first embodiment, and are not illustrated in FIG. 4 as no significant changes therein are made from the first embodiment. In addition, circuits of the digitizer 20A and the input information processing circuit 41A illustrated in FIG. 4 which have their equivalents in the digitizer 20 and the input information processing circuit 41 illustrated in FIG. 2 are designated by the same reference numerals as those of their equivalents, and detailed descriptions thereof will be omitted.

Figure 5A:
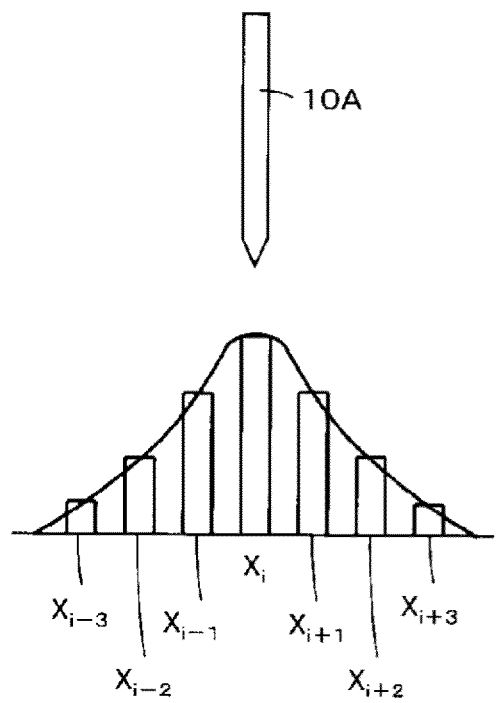
FIGS. 5A and 5B depicts diagrams for explaining an operation of detecting an inclination of an electronic pen through transfer of signals between the electronic pen and a digitizer.

As illustrated in FIG. 5A, when the electronic pen 10A is perpendicular to the input surface of the sensor, the signal levels of a specific number (which is greater than one) of, e.g., seven, loop coil positions Xi−3, Xi−2, Xi−1, Xi, Xi+1, Xi+2, and Xi+3 assume a symmetric shape with the indicated position in the center.

Figure 5B:
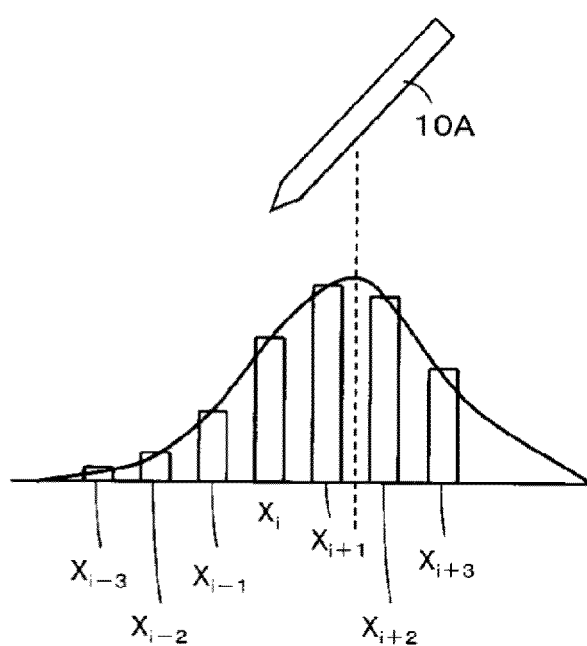

In contrast, as illustrated in FIG. 5B, when the electronic pen 10A is inclined, the signal levels of these seven loop coil positions Xi−3, Xi−2, Xi−1, Xi, Xi+1, Xi+2, and Xi+3 vary in accordance with the direction in which the electronic pen 10A is inclined and the angle at which the electronic pen 10A is inclined. The position coordinates of the position indicated by the electronic pen 10A and the inclination angle and inclination direction of the electronic pen 10A can be detected on the basis of the specific number of signal levels.

Figure 6:
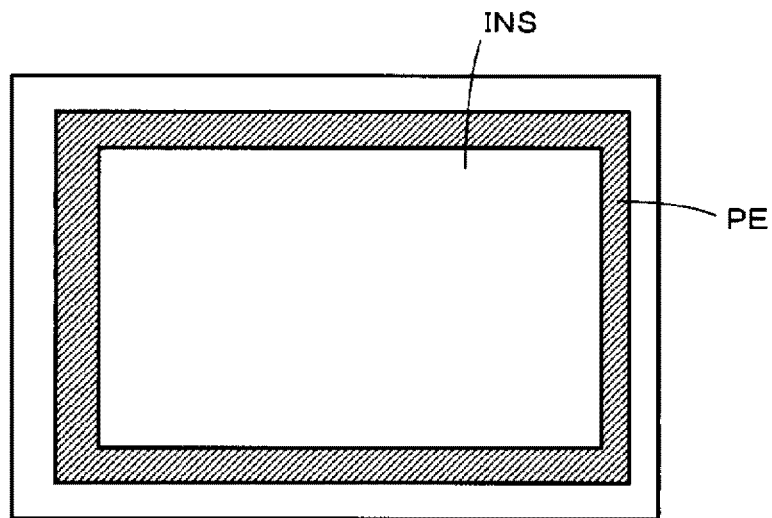
FIG. 6 is a diagram used to explain that the precision with which the position indicated by the electronic pen and the inclination of the electronic pen are detected by the digitizer through transfer of signals between the electronic pen and the digitizer is different between a peripheral region of an input surface and another region.

However, with respect to an input surface (i.e., a detection region) INS of the sensor illustrated in FIG. 6, only a smaller number (which is greater than one) of signal levels than the aforementioned specific number can be obtained in, for example, a peripheral region PE indicated by oblique lines outside of the position of a dotted line. Accordingly, the following point is taken into account, in this second embodiment, the precision with which the position (i.e., the position of the pen point) indicated by the electronic pen 10A and the pen posture of the electronic pen 10A can be detected in the peripheral region PE of the digitizer 20A is reduced, and in the case of this second embodiment, the detection precision of the position (i.e., the position of the pen point) indicated by the electronic pen 10A and the pen posture of the electronic pen 10A detected in the spatial position detector 30 is higher.

That is, in this second embodiment, even when the position of the pen point of the electronic pen 10A is in the spatial region of the position detection region DT, in which the position indicated by the electronic pen 10A and the pen posture can be detected in the digitizer 20A, information regarding the position indicated by the electronic pen 10A and the pen posture detected in the spatial position detector 30 is used, instead of information regarding the position indicated by the electronic pen 10A and the pen posture detected in the digitizer 20A, if the position of the pen point of the electronic pen 10A is in the peripheral region PE or in a spatial region over the peripheral region PE.

As illustrated in FIG. 4, the digitizer 20A according to this second embodiment includes a posture detection circuit 24. This posture detection circuit 24 detects the pen posture, such as the inclination angle, inclination direction, rotation angle of the electronic pen 10A on the basis of transfer of signals between the electronic pen 10A (not illustrated) and a sensor 22 of the digitizer 20A. Information about the pen posture of the electronic pen 10A detected in this posture detection circuit 24 is supplied to one input terminal of a selection circuit 418 of the input information processing circuit 41A. Information about the pen posture of the electronic pen 10A detected using the spatial position detector 30 is supplied from a pen posture detection circuit 4102 of the spatial information processing circuit 410 to another input terminal of the selection circuit 418.

The information regarding the pen posture of the electronic pen 10A is supplied from the selection circuit 418 to an associating circuit 415, and is subjected to an associating process similar to the above-described associating process to be associated with the information regarding the position indicated by the electronic pen 10A from a selection circuit 411, and the resultant is supplied to each of the drawing image generation circuit 421 and the gesture detection processing circuit 423 of the display image generation circuit 42.

Meanwhile, in this second embodiment, the information regarding the pen posture of the electronic pen 10A detected in the pen posture detection circuit 4102 of the spatial information processing circuit 410 is supplied to one input terminal of a selection circuit 419. In addition, the information regarding the pen posture of the electronic pen 10A is supplied from the posture detection circuit 24 of the digitizer 20A to a posture conversion circuit 417R, while information regarding a digitizer posture including the inclination angle and inclination direction of the digitizer 20A detected in a digitizer posture detection circuit 4103 of the spatial information processing circuit 410 is supplied to the posture conversion circuit 417R.

In the posture conversion circuit 417R, the information regarding the pen posture of the electronic pen 10A from the posture detection circuit 24 of the digitizer 20A, and the information regarding the posture of the digitizer 20A from the digitizer posture detection circuit 4103 of the spatial information processing circuit 410, are subjected to the reverse of the conversion performed in a posture conversion circuit 417. That is, the pen posture of the electronic pen 10A relative to the input surface 21S detected in the digitizer 20A is converted to an absolute posture of the digitizer 20A in the spatial coordinate system of the spatial motion detection region MD to be detected in the spatial position detector 30.

Then, information regarding the pen posture of the electronic pen 10A resulting from the posture conversion in the posture conversion circuit 417R is supplied to another input terminal of the selection circuit 419. Information about the pen posture of the electronic pen 10A to be selected in and outputted from the selection circuit 419 as described below is supplied to an associating circuit 416, and is subjected to an associating process similar to the above-described associating process to be associated with the information regarding the position indicated by the electronic pen 10A from a selection circuit 412, and the resultant is supplied to the VR image generation circuit 422 of the display image generation circuit 42.

A selection control signal generation circuit 414A according to this second embodiment generates selection control signals SEA for the selection circuit 411, the selection circuit 412, the selection circuit 418, and the selection circuit 419. In addition, the selection control signal generation circuit 414A generates a selection control signal SE similar to the selection control signal SE generated by the selection control signal generation circuit 414 according to the above-described first embodiment, and thus selectively controls processes performed by the drawing image generation circuit 421 and the gesture detection processing circuit 423 of the display image generation circuit 42 in a manner similar to that of the above-described first embodiment.

The selection control signals SEA from the selection control signal generation circuit 414A according to this second embodiment are configured to not only selectively control the selection circuits 411, 412, 418, and 419 depending on whether the position (i.e., the position of the pen point) indicated by the electronic pen 10A lies within or outside of the spatial region of the position detection region DT of the digitizer 20A, but also selectively control the selection circuits 411, 412, 418, and 419 depending on whether the position lies in the peripheral region PE (see FIG. 6) of the input surface 21S of the digitizer 20A or in a central region inside of the peripheral region PE of the input surface 21S.

Accordingly, in addition to information regarding the signal level of the reception signal from the electronic pen 10A, the information regarding the position indicated by the electronic pen 10A is supplied from a position detection circuit 23 of the digitizer 20A to the selection control signal generation circuit 414A according to this second embodiment. Then, the selection control signal generation circuit 414A generates the selection control signals SEA for selectively controlling the selection circuits 411, 412, 418, and 419 depending on whether the position (i.e., the position of the pen point) indicated by the electronic pen 10A lies within the spatial region of the position detection region DT and in the spatial region of the central region inside of the peripheral region PE or in a spatial region outside thereof.

Through the selection control signal SEA, the selection circuit 411 selects the information regarding the position indicated by the electronic pen 10A from the position detection circuit 23 of the digitizer 20A and supplies the selected information to the associating circuit 415 when the position (i.e., the position of the pen point) indicated by the electronic pen 10A lies within the spatial region of the position detection region DT and in the spatial region of the central region inside of the peripheral region PE, and selects the information regarding the position indicated by the electronic pen 10A from a spatial position detection circuit 4101 and a coordinate conversion circuit 413 and supplies the selected information to the associating circuit 415 when the position (i.e., the position of the pen point) indicated by the electronic pen 10A lies in a spatial region outside thereof.

Meanwhile, through the selection control signal SEA, the selection circuit 412 selects the information regarding the position indicated by the electronic pen 10A from the position detection circuit 23 of the digitizer 20A and supplies the selected information to the associating circuit 416 when the position (i.e., the position of the pen point) indicated by the electronic pen 10A lies within the spatial region of the position detection region DT and in the spatial region of the central region inside of the peripheral region PE, and selects the information regarding the position indicated by the electronic pen 10A from the spatial position detection circuit 4101 subjected to the coordinate conversion process in the coordinate conversion circuit 413 and supplies the selected information to the associating circuit 416 when the position (i.e., the position of the pen point) indicated by the electronic pen 10A lies in a spatial region outside thereof.

Meanwhile, through the selection control signal SEA, the selection circuit 418 selects the information regarding the pen posture of the electronic pen 10A from the posture detection circuit 24 of the digitizer 20A and supplies the selected information to the associating circuit 415 when the position (i.e., the position of the pen point) indicated by the electronic pen 10A lies within the spatial region of the position detection region DT and in the spatial region of the central region inside of the peripheral region PE, and selects the information regarding the relative pen posture from the posture conversion circuit 417 resulting from converting the pen posture of the electronic pen 10A detected in the pen posture detection circuit 4102 and supplies the selected information to the associating circuit 415 when the position (i.e., the position of the pen point) indicated by the electronic pen 10A lies in a spatial region outside thereof.

Meanwhile, through the selection control signal SEA, the selection circuit 419 selects the information regarding the absolute pen posture to be detected in the spatial position detector 30, which is supplied from the posture conversion circuit 417R and results from converting the pen posture of the electronic pen 10A detected in the posture detection circuit 24 of the digitizer 20A, and supplies the selected information to the associating circuit 416 when the position (i.e., the position of the pen point) indicated by the electronic pen 10A lies within the spatial region of the position detection region DT and in the spatial region of the central region inside of the peripheral region PE, and selects the information regarding the pen posture of the electronic pen 10A from the pen posture detection circuit 4102 and supplies the selected information to the associating circuit 416 when the position (i.e., the position of the pen point) indicated by the electronic pen 10A lies in a spatial region outside thereof.

Figure 7:
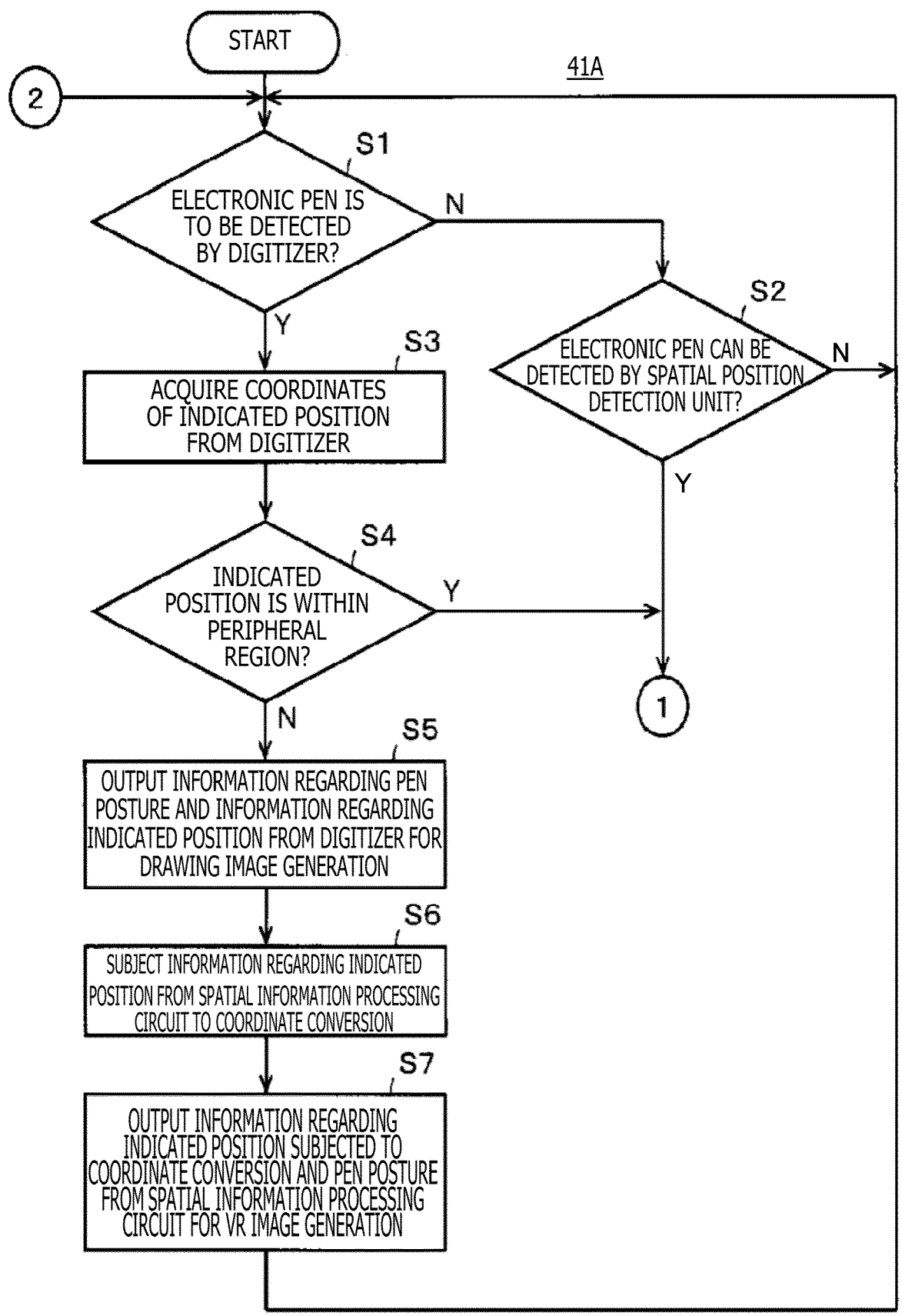
FIG. 7 is a diagram illustrating a part of a flowchart for explaining a primary operation of the input device according to the second embodiment of the disclosure.

An example of a flow of a processing operation performed in the case where the input information processing circuit 41A of the spatial position indication system according to this second embodiment is formed by a computer will now be described below with reference to FIG. 7 and FIG. 8, which follows FIG. 7. Note that, in this case, the various blocks of the input information processing circuit 41A illustrated in FIG. 4 are functional software circuits implemented by a program for the computer.

That is, the input information processing circuit 41A determines from a signal from the digitizer 20A whether or not a state in which the position indicated by the electronic pen 10A is to be detected by the digitizer 20A has been brought about (S1). When it is determined at S1 that the state in which the position indicated by the electronic pen 10A is to be detected by the digitizer 20A has not been brought about, the input information processing circuit 41A determines whether or not the electronic pen 10A can be detected by the spatial position detector 30 (S2). When it is determined at S2 that the electronic pen 10A cannot be detected by the spatial position detector 30, the input information processing circuit 41A returns control to S1.

When it is determined at S1 that the state in which the position indicated by the electronic pen 10A is to be detected by the digitizer 20A has been brought about, the input information processing circuit 41A acquires the coordinates of the position indicated by the electronic pen 10A and detected by the digitizer 20A (S3), and determines whether or not the acquired coordinates of the indicated position are within the peripheral region PE (S4).

When it is determined at S4 that the acquired coordinates of the indicated position are not within the peripheral region PE but within the region inside thereof, the input information processing circuit 41A associates the information regarding the pen posture and the information regarding the position indicated by the electronic pen 10A from the digitizer 20A with each other, and outputs the resultant to the display image generation circuit 42 for drawing image generation (S5).

Next, the input information processing circuit 41A subjects the information regarding the position indicated by the electronic pen 10A and detected in the spatial position detection circuit 4101 of the spatial information processing circuit 410 to coordinate conversion to be converted to information regarding the coordinate system shared with the digitizer 20A (S6). Then, the input information processing circuit 41A associates the information regarding the position indicated by the electronic pen 10A subjected to the coordinate conversion, and the information regarding the pen posture detected in the pen posture detection circuit 4102 of the spatial information processing circuit 410, with each other, and outputs the resultant to the display image generation circuit 42 for VR image generation (S7). After S7, the input information processing circuit 41A returns control to S1, and the acts subsequent to S1 are repeated.

Figure 8:
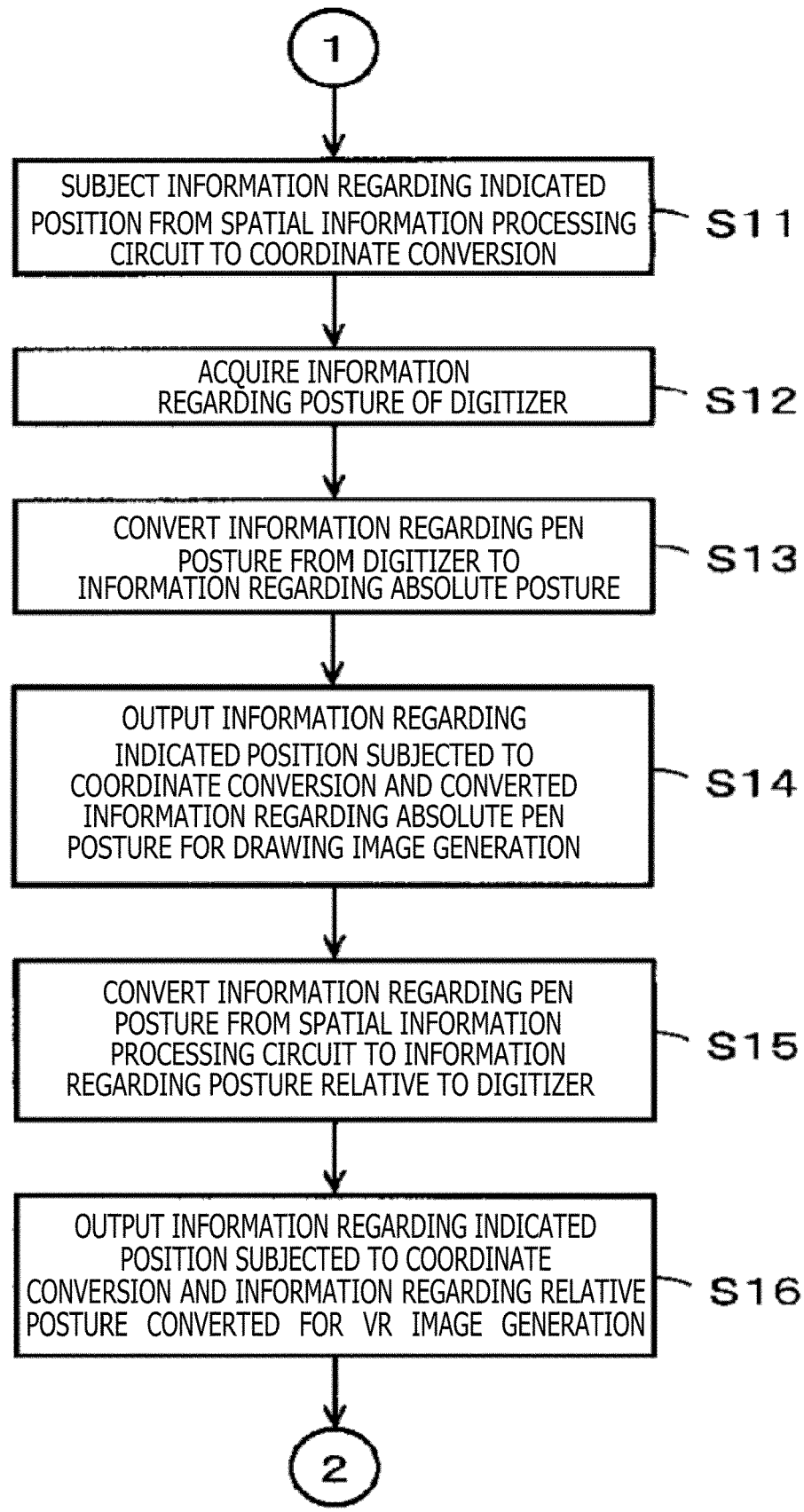
FIG. 8 is a diagram illustrating a part of the flowchart for explaining the primary operation of the input device according to the second embodiment of the disclosure.

Next, when it is determined at S4 that the acquired coordinates of the indicated position are within the peripheral region PE, or when it is determined at S2 that the electronic pen 10A can be detected by the spatial position detector 30, the input information processing circuit 41A subjects the information regarding the position indicated by the electronic pen 10A and detected in the spatial position detection circuit 4101 of the spatial information processing circuit 410 to coordinate conversion to be converted to information regarding the coordinate system shared with the digitizer 20A (S11 in FIG. 8). In addition, the input information processing circuit 41A acquires the information regarding the posture of the digitizer 20A detected in the digitizer posture detection circuit 4103 of the spatial information processing circuit 410 (S12).

Next, the input information processing circuit 41A converts the information regarding the pen posture from the posture detection circuit 24 of the digitizer 20A to information regarding an absolute posture in a spatial region, instead of a posture relative to the digitizer 20A, using the information regarding the posture of the digitizer 20A acquired at S12 (S13). Then, the input information processing circuit 41A associates the information regarding the position indicated by the electronic pen 10A resulting from the coordinate conversion at S11 and the information regarding the absolute posture obtained at S13 with each other, and outputs the resultant to the display image generation circuit 42 for drawing image generation (S14).

Next, the input information processing circuit 41A converts the information regarding the pen posture from the pen posture detection circuit 4102 of the spatial information processing circuit 410 to information regarding a posture relative to the digitizer 20A, using the information regarding the posture of the digitizer 20A acquired at S12 (S15). Then, the input information processing circuit 41A associates the information regarding the position indicated by the electronic pen 10A resulting from the coordinate conversion at S11 and the information regarding the absolute posture obtained at S13 with each other, and outputs the resultant to the display image generation circuit 42 for VR image generation (S16). After S16, the input information processing circuit 41A returns control to S1, and the acts subsequent to S1 are repeated.

The input information processing circuit 41A of the spatial position indication system according to this second embodiment has the above-described configuration, and thus, as the information regarding the position indicated by the electronic pen 10A in each of the 3D drawing-related process and the VR image-related process, the information regarding the position indicated by the electronic pen 10A and detected in the position detection circuit 23 of the digitizer 20A with higher precision than when detected in the spatial position detector 30 is used for the central region inside of the peripheral region PE of the input surface 21S within the spatial region of the position detection region DT of the digitizer 20A, and the information regarding the position indicated by the electronic pen 10A and detected in the spatial position detection circuit 4101 of the spatial position detector 30 with higher precision than when detected in the position detection circuit 23 of the digitizer 20A is used for the peripheral region PE (including a corresponding space over the input surface 21S) of the input surface 21S within the spatial region of the position detection region DT of the digitizer 20A and a spatial region outside of the spatial region of the position detection region DT.

In addition, as the information regarding the pen posture of the electronic pen 10A in the 3D drawing-related process, the information regarding the pen posture of the electronic pen 10A detected in the posture detection circuit 24 of the digitizer 20A with higher precision than when detected in the spatial position detector 30 is used for the central region inside of the peripheral region PE of the input surface 21S within the spatial region of the position detection region DT of the digitizer 20A, and the information regarding the pen posture of the electronic pen 10A detected in the pen posture detection circuit 4102 of the spatial position detector 30 with higher precision than when detected in the position detection circuit 23 of the digitizer 20A is used for the peripheral region PE (including the corresponding space over the input surface 21S) of the input surface 21S within the spatial region of the position detection region DT of the digitizer 20A and the spatial region outside of the spatial region of the position detection region DT.

Accordingly, both the 3D drawing-related process and the VR image-related process can be performed always using information with high precision in this second embodiment as in the first embodiment. In this case, as in the first embodiment, advantageous convenience is provided in that a complementary use of the information detected in the digitizer 20A and the information detected in the spatial position detector 30 is possible in each of the 3D drawing-related process and the VR image-related process.

Third Embodiment

While, in each of the first embodiment and the second embodiment described above, the input device according to an embodiment of the disclosure is applied to the spatial position indication system, an input device according to an embodiment of the disclosure is applicable also in the case where a position indication by an electronic pen is detected within a position detection region DT, including a hover region, in a tablet device provided with a digitizer.

Figure 9:
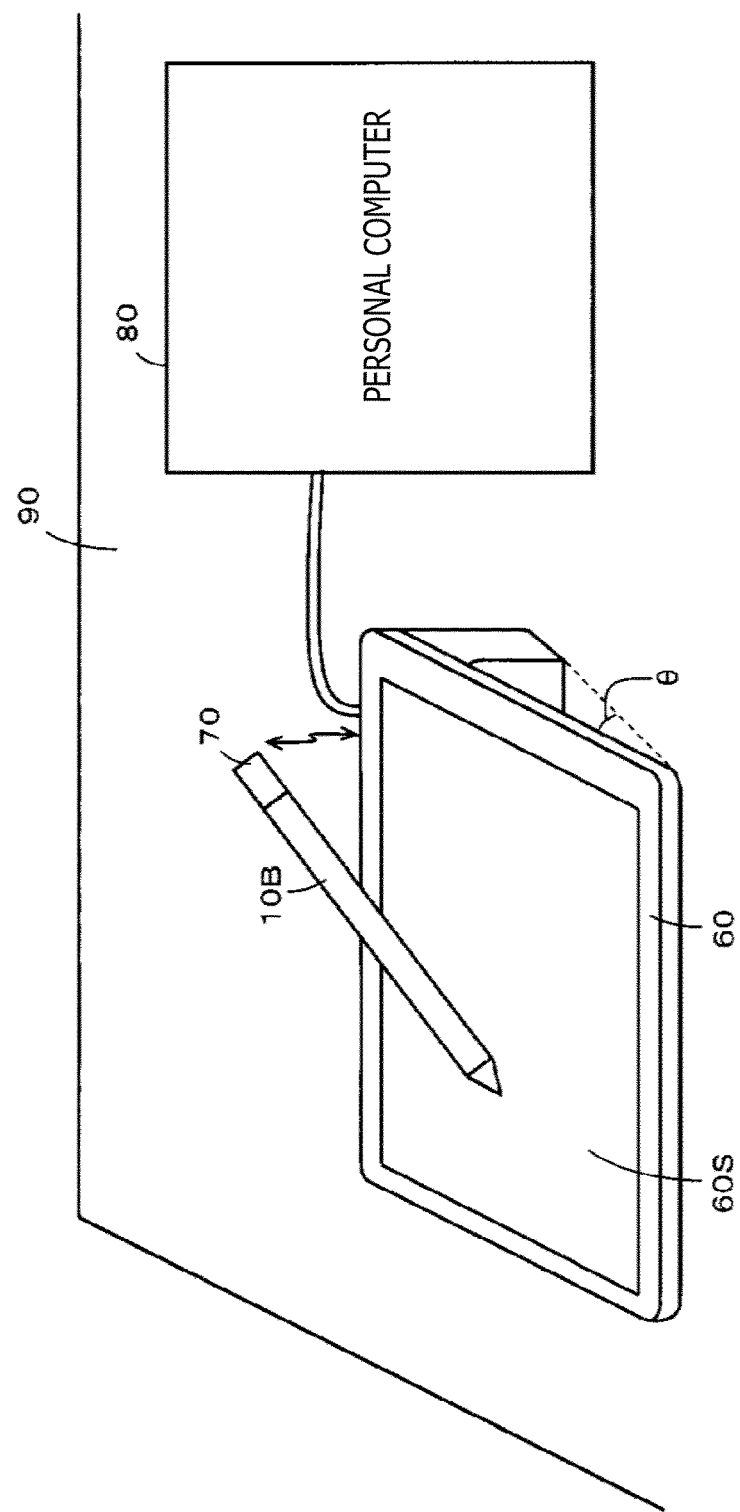
FIG. 9 is a diagram for explaining an example configuration of an input device according to a third embodiment of the disclosure.

FIG. 9 is a diagram illustrating an outline of a system including an input device according to this third embodiment. In FIG. 9, the input device according to the third embodiment is made up of an electronic pen 10B and a tablet device 60 provided with a digitizer. As illustrated in FIG. 9, the tablet device 60 of this input device is, for example, placed on a desk 90, and is connected to a computer 80. In addition, in this example, the tablet device 60 is mounted on a mounting surface of the desk 90, for example, at an inclination angle θ with respect thereto.

In addition, in this third embodiment, a gyro sensor device 70 for detecting the pen posture of the electronic pen 10B in a three-dimensional space over an input surface 61S of the digitizer contained in the tablet device 60 is removably attached to the electronic pen 10B on a rear-end side opposite to a pen-point side thereof. Note that the gyro sensor device 70 may be contained in the electronic pen 10B on the rear-end side opposite to the pen-point side thereof.

Figure 10:
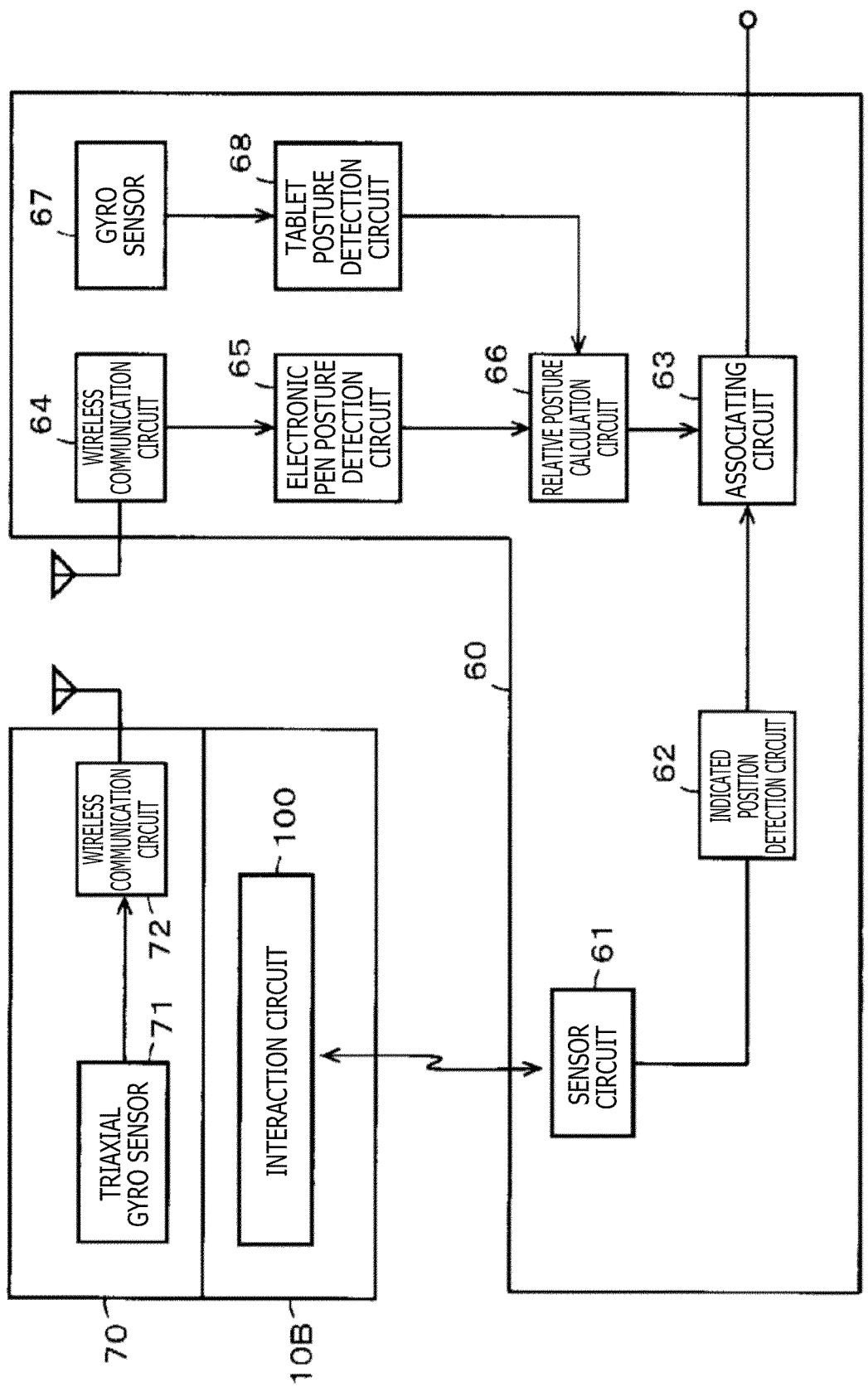
FIG. 10 is a block diagram for explaining an example configuration of various circuits of the input device according to the third embodiment of the disclosure.

FIG. 10 is a block diagram for explaining an example functional configuration of the electronic pen 10B, the tablet device 60, and the gyro sensor device 70 of the input device according to this third embodiment. In this case, the gyro sensor device 70 is configured to include, for example, a triaxial gyro sensor 71 and a wireless communication circuit 72. The wireless communication circuit 72 is formed by, for example, short-range wireless communication device that complies with the Bluetooth (registered trademark) standard. The wireless communication circuit 72 is not limited to the above, but may alternatively be configured to perform optical communication, such as infrared communication.

In this example, the gyro sensor device 70 is attached to a housing of the electronic pen 10B, and thus, the triaxial gyro sensor 71 outputs an output signal according to an inclination angle, an inclination direction, and a rotation angle of the electronic pen 10B in the three-dimensional space. Here, the output signal of the electronic pen 10B according to the inclination angle, the inclination direction, and the rotation angle of the electronic pen 10B detected in the triaxial gyro sensor 71 does not correspond to the posture of the electronic pen 10B relative to the input surface 61S of the tablet device 60, but corresponds to the absolute posture thereof in the three-dimensional space based on the axis of the earth. The wireless communication circuit 72 transmits the output signal from the triaxial gyro sensor 71 to the tablet device 60 in a wireless manner.

The electronic pen 10B includes an interaction circuit 100 that interacts with a sensor 61 of the tablet device 60. The interaction circuit 100 is coupled to the sensor 61 of the tablet device 60 by an electromagnetic induction method or a capacitive coupling method to exchange signals therewith. The interaction circuit 100 of the electronic pen 10B in this example exchanges signals for position detection of the position indicated by the electronic pen 10B with the sensor 61, and does not exchange therewith signals for detecting the pen posture, such as the inclination angle, inclination direction, rotation angle In the tablet device 60, from signals obtained as a result of an interaction between the sensor 61 and the electronic pen 10B, the position indicated by the electronic pen 10B is detected in an indicated position detection circuit 62. Information about the position indicated by the electronic pen 10B detected in the indicated position detection circuit 62 is supplied to an associating circuit 63.

The tablet device 60 according to this third embodiment includes a wireless communication circuit 64 that performs wireless communication with the wireless communication circuit 72 of the gyro sensor device 70. A detection output of the triaxial gyro sensor 71 of the gyro sensor device 70 received by this wireless communication circuit 64 is supplied to an electronic pen posture detection circuit 65, and the pen posture of the electronic pen 10B is detected. Information about the pen posture of the electronic pen 10B detected in this electronic pen posture detection circuit 65 is supplied to a relative posture calculation circuit 66.

The tablet device 60 according to this embodiment includes a gyro sensor 67 for detecting the inclination angle and inclination direction of the tablet device 60. A sensor output of this gyro sensor 67 is supplied to a tablet posture detection circuit 68. The tablet posture detection circuit 68 detects the inclination angle and inclination direction of the tablet device 60 on the basis of the sensor output of the gyro sensor 67, and supplies information (i.e., information regarding a tablet posture) about the detected inclination angle and inclination direction of the tablet device 60 to the relative posture calculation circuit 66.

The relative posture calculation circuit 66 corrects the information regarding the absolute pen posture of the electronic pen 10B in the three-dimensional space from the electronic pen posture detection circuit 65 using the information regarding the tablet posture from the tablet posture detection circuit 68, thereby calculating the pen posture of the electronic pen 10B relative to the input surface 61S of the tablet device 60. Then, the relative posture calculation circuit 66 supplies information regarding the calculated relative pen posture of the electronic pen 10B to the associating circuit 63.

As is similarly the case with the associating circuits described above, the associating circuit 63 associates the information regarding the position indicated by the electronic pen 10B and the information regarding the relative pen posture of the electronic pen 10B with each other, and outputs the resultant to the computer 80.

As described above, in the input device according to this third embodiment, when a position indicated by a pen point of the electronic pen 10B can be obtained, information regarding a pen posture of the electronic pen 10B which is correspondingly detected in the three-dimensional space through the gyro sensor device 70 provided on the rear-end side of the electronic pen 10B can be outputted as information regarding a pen posture corresponding to the position indicated by the electronic pen 10B.

Other Embodiments or Modifications

While, in each of the first embodiment and the second embodiment described above, the spatial position detector 30 is configured to include the light emitting/tracking devices that emit infrared laser beams and the trackers, it is needless to say that this configuration is not essential to the disclosure. For example, the spatial position detector may be configured to use other invisible light sensors, visible light sensors, any combination thereof, or the like.

In addition, in each of the first embodiment and the second embodiment described above, the operator of the electronic pen 10 wears the HMD 50, and is therefore not able to directly view the digitizer 20. Accordingly, a virtual image of the digitizer 20 may be drawn in an image of a virtual space displayed on the HMD 50 to enable the operator to recognize the position of the digitizer 20 through the display screen of the HMD 50.

Further, while, in each of the first embodiment and the second embodiment described above, the coordinate values of the spatial position detector 30 are converted to coordinate values in the spatial coordinate system of the digitizer 20 to correct an error in the two spatial coordinate systems, the coordinate values of the position detection region DT of the digitizer 20 may conversely be converted to coordinate values of the spatial position detector 30. Note that the conversion between the two spatial coordinate systems is not essential but optional.

While, in each of the first embodiment and the second embodiment described above, the electronic pen and the digitizer used employ the electromagnetic induction method, this is not essential to the disclosure, and an electronic pen and a digitizer that employ a capacitive method (e.g., an active capacitive coupling method, a passive capacitive coupling method, etc.) may naturally be used instead.

Also note that each of the digitizers according to the first embodiment and the second embodiment and the tablet device according to the third embodiment may be a portable cellular phone terminal often called a smart phone.

While it has been assumed that 3D images are drawn by the spatial position indication system according to each of the first embodiment and the second embodiment described above, the images to be drawn may alternatively be 2D (Two-Dimensional) drawing images or 2.5D drawing images.

DESCRIPTION OF REFERENCE SYMBOLS

10, 10A, 10B . . . Electronic pen, 20, 20A . . . Digitizer, 21S . . . Input surface, 22 . . . Sensor, 23 . . . Position detection circuit, 24 . . . Posture detection circuit, 30 . . . Spatial position detector, 40 . . . Spatial drawing information generation device, 41 . . . Input information processing circuit, 4101 . . . Spatial position detection circuit, 4102 . . . Pen posture detection circuit, 50 . . . HMD

The invention claimed is:

1. A Virtual Reality (VR) image generation system comprising:
   a sensor;
   a detection circuit which, in operation, detects a first indicated position indicated by an electronic pen in a first three-dimensional space in accordance with transfer of a signal between the electronic pen and the sensor;
   one or more processors; and
   one or more memory devices storing instructions that, when executed by the one or more processors, cause the one or more processors to:
   detect a first posture of the electronic pen in a second three-dimensional space, the first posture including at least one of a first inclination angle, a first inclination direction and a first rotation angle of the electronic pen, and
   generate, when the electronic pen is in the first three-dimensional space, a first VR image of drawing by the electronic pen, based on the first indicated position and the first posture.

2. The VR image generation system according to claim 1, wherein:
   the instructions, when executed by the one or more processors, cause the one or more processors to detect a second indicated position indicated by the electronic pen in the second three-dimensional space and generate, when the electronic pen is in the second three-dimensional space, the first VR image of drawing by the electronic pen, based on the second indicated position and the first posture.

3. The VR image generation system according to claim 1, wherein:
   the instructions, when executed by the one or more processors, cause the one or more processors to generate a second VR image of the electronic pen, based on the first posture.

4. The VR image generation system according to claim 3, wherein:
   the detection circuit, in operation, detects a second posture of the electronic pen in the first three-dimensional space, the second posture including at least one of a second inclination angle, a second inclination direction and a second rotation angle of the electronic pen, and
   the instructions, when executed by the one or more processors, cause the one or more processors to generate, when the electronic pen is in the first three-dimensional space, the second VR image of the electronic pen, based on the second posture.

5. The VR image generation system according to claim 4, wherein:
- the first inclination angle is an inclination angle relative to a particular direction in the second three-dimensional space, and
- the second inclination angle is an inclination angle relative to an input surface of the sensor.

6. The VR image generation system according to claim 3, wherein:
- the instructions, when executed by the one or more processors, cause the one or more processors generate a third VR image of a device that includes the sensor based.

7. The VR image generation system according to claim 1, wherein:
- the instructions, when executed by the one or more processors, cause the one or more processors to generate a second VR image of the electronic pen based on the first indicated position indicated by the electronic pen in the first three-dimensional space.

8. The VR image generation system according to claim 1, wherein the instructions, when executed by the one or more processors, cause the one or more processors to:
- detect a second indicated position indicated by the electronic pen in the second three-dimensional space, and
- generate a second VR image of the electronic pen based on the second indicated position indicated by the electronic pen in the second three-dimensional space.

9. The VR image generation system according to claim 1, wherein:
- the instructions, when executed by the one or more processors, cause the one or more processors to detect the first posture of the electronic pen based on output from a gyro sensor included in the electronic pen.

10. The VR image generation system according to claim 9, wherein:
- the instructions, when executed by the one or more processors, cause the one or more processors to detect a posture of the device that includes the sensor.

\* \* \* \* \*